Jan. 23, 1968    J. F. NEWCOMB    3,364,777

NULL DEVICE FOR HAND CONTROLLER

Filed Dec. 28, 1965    2 Sheets-Sheet 1

INVENTOR
JOHN F. NEWCOMB

BY

ATTORNEYS

Jan. 23, 1968    J. F. NEWCOMB    3,364,777
NULL DEVICE FOR HAND CONTROLLER
Filed Dec. 28, 1965    2 Sheets-Sheet 2

INVENTOR
JOHN F. NEWCOMB

BY

ATTORNEYS

United States Patent Office 3,364,777
Patented Jan. 23, 1968

3,364,777
NULL DEVICE FOR HAND CONTROLLER
John F. Newcomb, Gloucester Point, Va., assignor to the United States of America as represented by the Administrator of the National Aeronautics and Space Administration
Filed Dec. 28, 1965, Ser. No. 517,159
11 Claims. (Cl. 74—471)

ABSTRACT OF THE DISCLOSURE

A device for producing an accurate null position in a spring-centered member, consisting of positively limiting opposing movement of the spring members with respect to a reference structure. The reference structure is also adjustable with respect to a support to provide adjustability of the null position.

---

The invention described herein was made by an employee of the United States Government and may be manufactured and used by or for the Government for governmental purposes without the payment of any royalties thereon or therefor.

This invention relates generally to a hand controller and more particularly to a mechanism for precisely returning a control rod to a null or neutral position.

In recent years there has been an increasing need for miniature three-axis controllers to be employed in various control systems such for example as those of aerospace vehicles. The previously known controllers utilized a gimble system and a gear-electrical pickoff for each control motion. These previous systems failed to provide for the controls to be returned precisely to zero and the original zero or null position of the control rod could not be accurately adjusted. The neutral positioning devices developed by the prior art similarly failed to provide for accurate adjustment or precise return to zero and, further, are generally large and cumbersome and undesirable for use where space is a critical requirement. These devices normally introduce high frictional forces or require exact mating of springs to accurately position the lever or controller in the neutral position. Such assemblies become even more unreliable after extended use due to the unsymmetrical fatigue of the springs. Devices such as these are wholly inadequate for reliable operation in the extremely limited spaces.

In order to overcome the disadvantages of the prior art, the instant invention contemplates the use of a locator mechanism for accurately adjusting the neutral position and opposed resilient members for precise return of the controller to the neutral position.

It is an object of the instant invention to provide a control mechanism which returns precisely to a null position.

A further object of this invention is to provide a mechanism for accurately adjusting the neutral position of a controller.

Another object of the instant invention is to provide a controller wherein the control rod is returned precisely to the original zero position which may be accurately adjusted.

Still another object of this invention is to provide a locator mechanism for accurately adjusting the neutral position of a controller and a positioning mechanism for precisely returning the controller to that neutral position.

A still further object of the instant invention is to provide a locator mechanism for accurately adjusting the null position of a control rod while utilizing a pair of oppositely disposed resilient arcuate members for precise return of the control rod to that null position when the control force is removed.

Generally, the foregoing and other objects are accomplished by utilizing pivoted members attached to a mount and a base plate with a thumbscrew extending between the pivoted flanges such that slight rotation of the thumbscrew causes slight lateral movement of the base plate. Opposed arcuate resilient members mounted on the base plate with a stop centered thereon for preventing unsymmetrical movement of the resilient members. The control rod is pivoted about the same point as the base plate and is provided with a rider element that acts against the resilient members when a control force is applied.

A more complete appreciation of the invention and many of the attendant advantages thereof will be readily apparent as the same becomes better understood by reference to the following description when considered in connection with the accompanying drawings, wherein.

Figure 1:
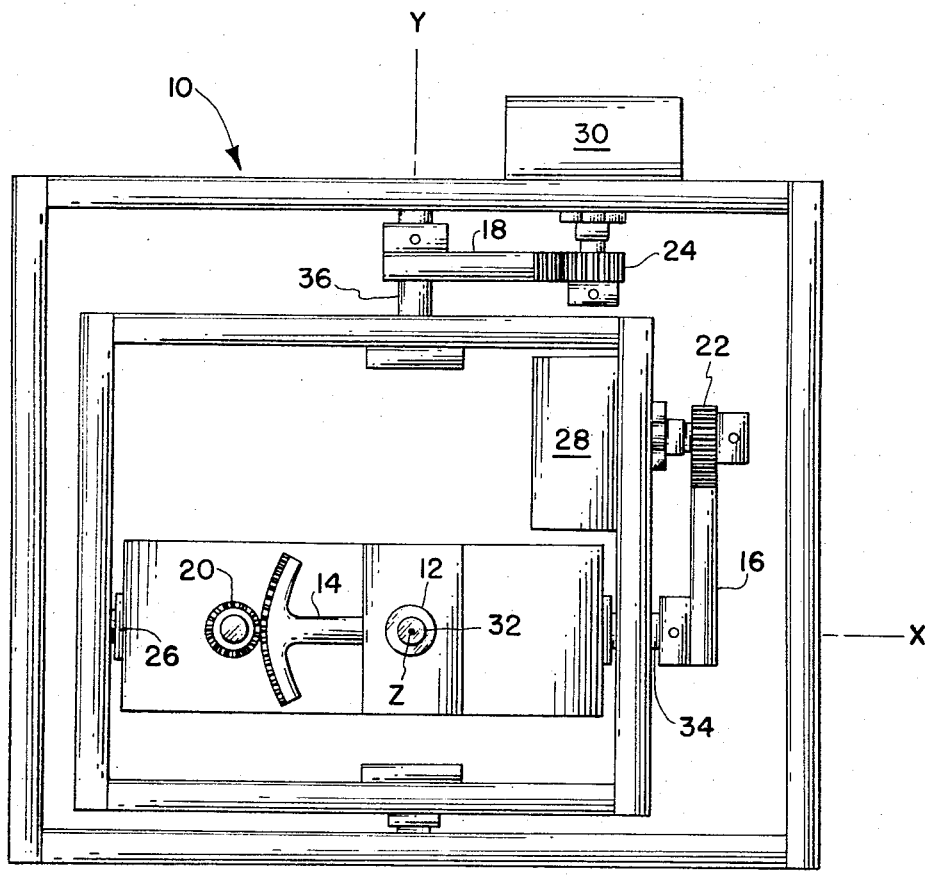
FIG. 1 is a schematic general plan view of a three-axis controller of the prior art.

Referring now to the drawings and more particularly to FIG. 1 wherein a three-axis hand controller 10 is shown to include mechanisms for control about the X, Y, and Z axes. Control rod 12 is shown in end view and controls gears 14, 16 and 18 through a conventional universal joint, not shown. Gears 14, 16 and 18 rotate with the controls and engage cog wheels 20, 22 and 24 which in turn rotate sensors, not shown, in potentiometers 26, 28 and 30. Gimbal rods 32, 34, and 36 act to support and permit rotation of gears 14, 16 and 18, respectively. The above described controllers and others like it are typical of the prior art.

Figure 2:
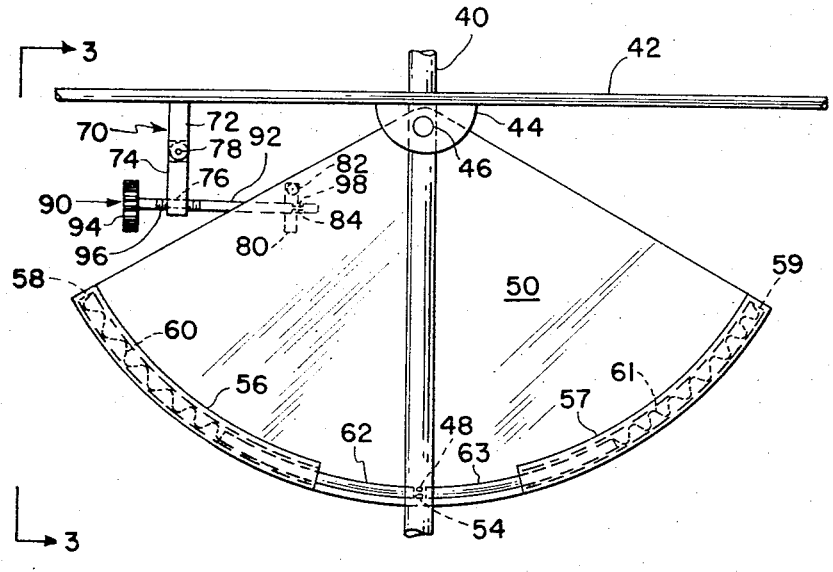
FIG. 2 is basically a rear elevation view of the novel null device of the instant invention.
Figure 3:
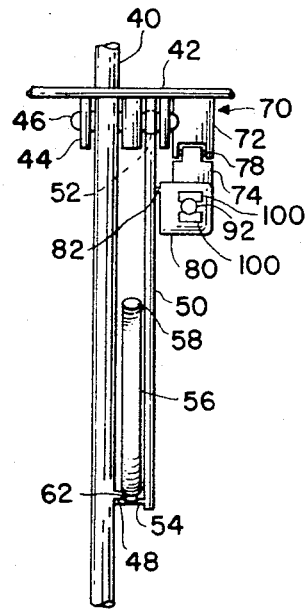
FIG. 3 is an elevational view of the null device of FIG. 2 taken in the direction of line 3—3.

Referring now to FIGS. 2 and 3 wherein the instant inventive null device is shown to include sensing rod 40, which may be equated to hand controller 12, suspended from a support, shown as a framework mount 42. Brackets 44 are rigidly fixed to framework 42 and have pin 46 extending therebetween. Sensing rod 40 has rider 48 rigidly affixed thereto and centered for a purpose to be described more fully hereinafter.

Base plate 50 is substantially pie-shaped and flat having an aperture 52 near the point thereof for permitting pivotal movement of plate 50 about pin 46. Stop 54 is centrally located adjacent, but spaced from the arcuate edge of plate 50 and extends therefrom in the direction of sensing rod 40. A pair of arcuate tubular guides 56 and 57 are secured to plate 50 along the arcuate edge thereof and respectively have closures 58 and 59 for closing the outer ends thereof along the straight edges of plate 50. A pair of retainer opposed springs 60 and 61 are respectively disposed in guides 56 and 57 and abut closures 58 and 59 thereof. A pair of arcuate plungers 62 and 63 have a portion within and a portion extending from guides 56 and 57. Plungers 62 and 63 abut stop 54 thereby positively limiting the movement of these members toward each other in opposition to each other. Stop 54 and rider 48 are centrally alined when sensing rod 40 is in the null position.

Locator mechanism 70 includes mount flange 72 which is rigidly secured to framework 42 and hinge leaf 74 having threaded bore 76 extending therethrough. Mount flange 72 and hinge leaf 74 are pivotally mated by pin 78. Plate flange 80 is pivotally mounted on plate 50 by pin 82 which extends from plate 50 in a direction opposite to that of stop 54. Flange 80 is provided with bore 84 for receiving thumbscrew 90.

Figure 5:
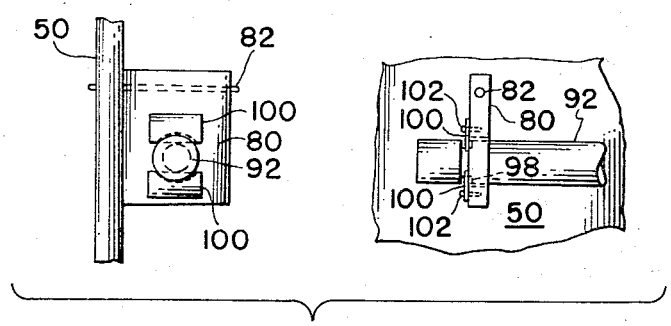
FIG. 5 is a detailed view of a portion of FIG. 2.

Thumbscrew 90 includes shank 92 having enlargement 94 at one end thereof. Threads 96 on shank 92 are adjacent enlargement 94 and engage threaded aperture 76. As best seen in FIG. 5, adjacent the other end of shank 92 is annular groove or slot 98 which is positioned to be in proximity to flange 80. Retaining plates 100 are mounted on plate flange 80 by screws 102 to fit within slot or groove 98 in shank 92 and thus cause movement of plate flange 80 upon rotation of enlargement 94 of thumbscrew 90.

Figure 4:
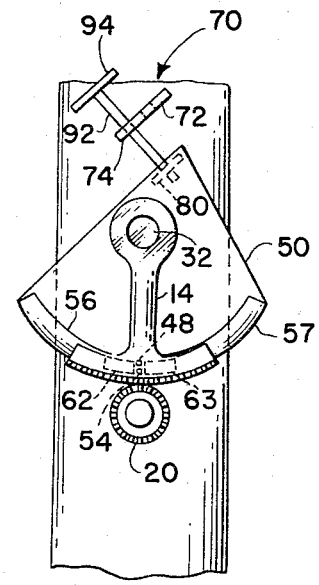
FIG. 4 shows the instant invention as applied to the prior art device of FIG. 1.

FIG. 4 shows the instant invention installed on one of the three axes of a controller such as that shown in FIG. 1. The null positioning device is installed on gear 14 which allows movement about the Z axis. Guides 56 and 57 are mounted on plate 50 which pivots about gimbal rod 32 while rider 48 is secured to gear 14, which is now the motion sensor. In this assembly, locator mechanism 70 is mounted behind the pivot point which would be the center of gimbal rod 32. Gimbal rod 32 thereby being equivalent to pivot pin 46 shown in FIG. 2. Obviously, the device would be mounted upon the other two axes of the three-axis controller of FIG. 1.

Operation

The pilot, either directly or by a linkage (not shown), moves control rod 40 to the right, FIG. 2, rotating the bottom of rod or sensor 40 to the left. Plunger rider 48 picks up plunger 62 and drives it back into guide 56 thereby compressing spring 60. At the point of maximum displacement of sensing rod 40 the face of plunger 62 is flush with the open end of tubular guide 56 and therefore plunger rider 48 comes to a definite stop when it rests against the face of guide 56. Plunger 63 is not displaced since it is resting against plunger stop 54. When the pilot releases pressure on controller 40, compressed spring 60 forces plunger 62, and in turn control rod or sensor 40, back to the original zero or neutral position. Once sensor 40 is back in the null position, plunger rider 48 is trapped between plungers 62 and 63 which always must stop at the same position because of plunger stop 54.

When the pilot moves the control rod 40 to the left the lower end of rider sensor 40 moves to the right, FIG. 2. This movement causes plunger rider 48 to press against plunger 63 forcing it into guide 57 and compressing spring 61. Plunger 62 remains in the original position as it is still resting against plunger stop 54. When the control force is released, rod 40 returns to the null position and remains there in a manner similar to that described for control movement to the right.

In the process of altering the zero or null position of control rod 40, thumbscrew 90 is rotated and threads 96 on shank 92 engage threaded bore 76 in leaf 74, thus moving thumbscrew 90 in or out of leaf 74. The end of thumbscrew 90 is retained in plate flange 80 by retainers 100 in such a manner that it can rotate but cannot move laterally therethrough. Thus, when thumbscrew 90 is rotated so as to screw into leaf 74, the total assembly on base plate 50 and control arm 40 will rotate to the right about pivot pin 46. Thumbscrew 90 is simply rotated in the opposite direction to rotate plate 50 and sensing rod 40 to the left. It is to be noted that leaf 74 and flange 80 are pivoted about pins 78 and 82, respectively, so as to form hinges. This arrangement permits thumbscrew 90 to follow the motion of plate 50.

From the foregoing description and explanation, it is readily apparent that springs 60 and 61 need not be matched but only be strong enough to return arm 40 to the null position and retain it there until pressure is again applied to control rod 40. In various circumstances, modifications may be made to the device as shown, for example, tubes 56 and 57 could be straight rather than arcuate. Such a construction might facilitate manufacturing but would introduce high friction between plunger rider 48 and plungers 62 and 63 as control rod 40 is moved. Thus it is seen that the instant invention provides an extremely accurate method of retaining the null position of a controller as well as a simple, reliable and effective method for that precise positioning. The simple and accurate positioning permits substantial miniaturization and the attendant utilization of the invention in restricted spaces. The instant device further provides the feature of easily and accurately adjusting the zero or neutral position.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. In a null device for a hand controller the combination comprising: a sensing member for sensing the movement of a controller member; a base plate; a support; locator means for positioning said base plate with respect to said support; rider means secured to said sensing member; opposed resilient means having respective portions engaging said rider means; stop means secured to said base plate positively limiting opposing movement of each of said respective portions relative said base plate, whereby said sensing member is accurately located with respect to said base plate and support.

2. The null device combination of claim 1 wherein said locator means comprises means rotatably mounting said base plate on said support and, pivotal mount means drivingly connected to said support; pivotal plate means drivingly connected to said base plate; a thumbscrew; means drivingly connecting said thumbscrew, said pivotal mount means, and said pivotal plate means providing relative movement between said pivotal mount means and said pivotal plate means when said thumbscrew is rotated, whereby rotation of said thumbscrew effects a movement of said base plate with respect to said support to establish a null position for said sensing member.

3. The null device combination of claim 1 wherein said opposed resilient means comprises: a pair of guide means mounted on said base plate; retainer spring means disposed in said guide means; and said respective portions comprise members disposed in said guide means and extending between said spring means and said rider means.

4. The null device combination of claim 1 wherein said stop means comprises: a boss rigidly mounted on said base plate centrally of said resilient means.

5. The null device combination of claim 4 wherein said rider means comprises: a projection on said sensing member, whereby said projection is disposed in alignment with said boss when said sensing means is in the null position.

6. The null device combination of claim 5 wherein said locator means comprises: a mount flange rigidly attached to said support; a hinge leaf pivotally connected with said mount flange by a first pin; a plate flange pivotally attached to said base plate by a second pin; a threaded bore in said hinge leaf; an aperture of substantially the same size as said bore in said plate flange; retaining plates adjustably secured to said plate flange; a thumbscrew having a shank with an enlargement at one end thereof; said shank having a threaded section adjacent said enlargement; an annular groove spaced from the other end of said shank for receiving said retaining plates, whereby rotation of said thumbscrew effects slight movement of said base plate.

7. The null device combination of claim 5 wherein said opposed resilient means comprises: a pair of oppositely disposed arcuate tubular guides attached to said base plate in a substantially spaced end-to-end relationship; said guides having closed outer ends; a spring disposed in each of said guides adjacent said closed end thereof; said respective portions comprise a plunger disposed in each of said guides in juxtaposition to said spring; a portion of each of said plungers extending beyond the end of said guides and having the end in abutting relation to said boss and said projection when said control rod is in the null position.

8. The null device combination of claim 7 wherein said locator means comprises: a mount flange rigidly attached to said support; a hinge leaf pivotally connected with said mount flange by a first pin; a plate flange pivotally attached to said base plate by a second pin; a threaded bore in said hinge leaf; an aperture of substantially the same size as said bore in said plate flange; retaining plates adjustably secured to said plate flange; a thumbscrew having a shank with an enlargement at one end thereof; said shank having a threaded section adjacent said enlargement; an annular groove spaced from the other end of said shank for receiving said retaining plates to effect slight movement of said base plate by rotation of said thumbscrew to thereby locate said base plate in a null position with respect to said sensing member.

9. The null device of claim 8 comprising: said sensing member including a gear thereon; said support including a gimbal rod; said gear and base plate pivotally mounted on said gimbal rod; and said locator means mounted on said base plate on said opposite side of said rod from said guide means.

10. In a controller the combination comprising: sensing means including a sensor rod; a base plate; support means for said sensing means and base plate including a gimbal rod; means pivotally mounting said base plate on said gimbal rod; a rider on said sensor rod; a pair of guides; means mounting said guide on said base plate in spaced, end-to-end relation with said rider means centrally disposed therebetween; spring means disposed in said guides; plunger means disposed in said guides and extending between said spring means and said rider; a stop mounted on said base plate disposed between said plunger means whereby said sensor rod is in alignment with said rider in the neutral position.

11. The combination of claim 10 further comprising: a mount flange rigidly attached to said support means; a hinge leaf pivotally connected with said mount flange by a first pin; a plate flange pivotally attached to said base plate by a second pin; a threaded bore in said hinge leaf; an aperture of substantially the same size as said bore in said plate flange; retaining plates adjustably secured to said plate flange; a thumbscrew having a shank with an enlargement at one end thereof; said shank having a threaded section adjacent said enlargement; an annular groove spaced from the other end of said shank for receiving said retaining plates, whereby rotation of said thumbscrew effects slight movement of said base plate.

No references cited.

FRED C. MATTERN, JR., *Primary Examiner.*

F. D. SHOEMAKER, *Assistant Examiner.*